United States Patent
Negi et al.

(10) Patent No.: US 8,688,606 B2
(45) Date of Patent: Apr. 1, 2014

(54) SMARTER BUSINESS INTELLIGENCE SYSTEMS

(75) Inventors: Sumit Negi, New Delhi (IN); Manish Anand Bhide, New Delhi (IN); Vishal Singh Batra, New Delhi (IN); Govind Kothari, Hyattsville, MD (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/012,554

(22) Filed: Jan. 24, 2011

(65) Prior Publication Data
US 2012/0191636 A1 Jul. 26, 2012

(51) Int. Cl.
G06F 17/00 (2006.01)
G06N 5/00 (2006.01)

(52) U.S. Cl.
USPC .......................................................... 706/45

(58) Field of Classification Search
USPC ..................................... 706/46; 709/223, 224
See application file for complete search history.

(56) References Cited

U.S. PATENT DOCUMENTS

| | | | | |
|---|---|---|---|---|
| 6,282,701 | B1* | 8/2001 | Wygodny et al. | 717/125 |
| 6,707,795 | B1* | 3/2004 | Noorhosseini et al. | 370/242 |
| 6,847,970 | B2* | 1/2005 | Keller et al. | 1/1 |
| 7,552,447 | B2* | 6/2009 | Uthe | 719/318 |
| 7,583,587 | B2* | 9/2009 | Qiu et al. | 370/216 |
| 7,721,152 | B1* | 5/2010 | Joshi et al. | 714/25 |
| 7,904,892 | B2* | 3/2011 | Babb et al. | 717/144 |
| 8,095,819 | B2* | 1/2012 | Watanabe et al. | 714/4.1 |
| 8,260,900 | B2* | 9/2012 | Morrison et al. | 709/223 |
| 2003/0067481 | A1* | 4/2003 | Chedgey et al. | 345/738 |
| 2003/0149586 | A1* | 8/2003 | Chen et al. | 705/1 |
| 2003/0149919 | A1* | 8/2003 | Greenwald et al. | 714/43 |
| 2004/0168100 | A1* | 8/2004 | Thottan et al. | 714/4 |
| 2004/0237077 | A1* | 11/2004 | Cole et al. | 717/162 |
| 2005/0049988 | A1 | 3/2005 | Dahlquist et al. | |
| 2005/0120273 | A1* | 6/2005 | Hudson et al. | 714/38 |
| 2005/0131927 | A1* | 6/2005 | Fildebrandt et al. | 707/101 |
| 2005/0177535 | A1 | 8/2005 | Song | |
| 2005/0210331 | A1* | 9/2005 | Connelly et al. | 714/26 |
| 2007/0022000 | A1 | 1/2007 | Bodart et al. | |
| 2007/0028220 | A1* | 2/2007 | Miller et al. | 717/124 |
| 2007/0162903 | A1* | 7/2007 | Babb et al. | 717/154 |
| 2008/0235365 | A1* | 9/2008 | Bansal et al. | 709/224 |

(Continued)

OTHER PUBLICATIONS

Rooney, James, et al., "Root Cause Analysis for Beginners", Quality Progress, Jul. 2004, pp. 45-53.

(Continued)

Primary Examiner — Jeffrey A Gaffin
Assistant Examiner — Thomas Fink
(74) Attorney, Agent, or Firm — Cahn & Samuels, LLP (57) ABSTRACT

An embodiment of the invention provides a method and system for analyzing a plurality of reports. More specifically, a change detection module predicts results of future reports based on past reports and identifies a first report that deviates from its predicted results. A dependency analysis module connected to the change detection module at least one report sharing a dependency with the first report by performing a dependency analysis and/or a usage analysis. The dependency analysis labels the first report and at least one second report as sharing a dependency if the second report deviates from its predicted results. The usage analysis labeling the first report and at least one report analyzed by an analyst as sharing a dependency if the report analyzed by the analyst is analyzed in response to the identification of the first report.

10 Claims, 4 Drawing Sheets

(56) References Cited

U.S. PATENT DOCUMENTS

| | | | |
|---|---|---|---|
| 2009/0028053 A1* | 1/2009 | Kannan et al. | 370/241 |
| 2009/0144305 A1* | 6/2009 | Little | 707/101 |
| 2009/0171879 A1* | 7/2009 | Bullen et al. | 706/47 |
| 2009/0204696 A1* | 8/2009 | Zhang et al. | 709/223 |
| 2010/0228854 A1* | 9/2010 | Morrison et al. | 709/224 |
| 2010/0281488 A1* | 11/2010 | Krishnamurthy et al. | 718/106 |
| 2012/0072887 A1* | 3/2012 | Basak | 717/123 |
| 2012/0101800 A1* | 4/2012 | Miao et al. | 703/22 |
| 2012/0297264 A1* | 11/2012 | Benware | 714/738 |

OTHER PUBLICATIONS

Gartner, "Key Issues for Business Intelligence and Performance Management Initiatives" http://www.gartner.com/it/content/660408/key_issues_bi_research.pdf.

* cited by examiner

SMARTER BUSINESS INTELLIGENCE SYSTEMS

BACKGROUND

The present invention is in the field of methods and computer program products for smarter business intelligence systems.

Business intelligence teams use reports for reporting and analytics. Business intelligence reports (BI reports) are often meta-data rich. A large amount of manual effort goes into designing the content of BI reports and the navigational structure across these reports. Root cause analysis involves retrieving the appropriate reports relevant to the current analysis focus.

SUMMARY OF THE INVENTION

An embodiment of the invention provides a method and system for analyzing a plurality of reports. More specifically, a change detection module predicts results of future reports based on past reports and identifies a first report that deviates from its predicted results. A dependency analysis module connected to the change detection module at least one report sharing a dependency with the first report by performing a dependency analysis and/or a usage analysis. The dependency analysis labels the first report and at least one second report as sharing a dependency if the second report deviates from its predicted results. The usage analysis labeling the first report and at least one report analyzed by an analyst as sharing a dependency if the report analyzed by the analyst is analyzed in response to the identification of the first report.

The dependency analysis module also performs a fine grained analysis. Specifically, if the dependency analysis is performed, the first report and the at least one second report are labeled as sharing a dependency if at least one sub-component of the first report and at least one sub-component of the second report share a dependency. If the usage analysis is performed, the first report and the at least one report analyzed by the analyst are labeled as sharing a dependency if at least one sub-component of the first report and at least one sub-component of the report analyzed by the analyst share a dependency.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention performs a dependency analysis, usage analysis, and/or fine grain analysis. As described more fully below, the dependency analysis finds the dependencies between various reports; and, the usage analysis finds usage patterns of various reports generated in the past. The fine grain analysis involves the analysis of the report generation structure query language (SQL) to find a root cause at a fine level.

Figure 1:
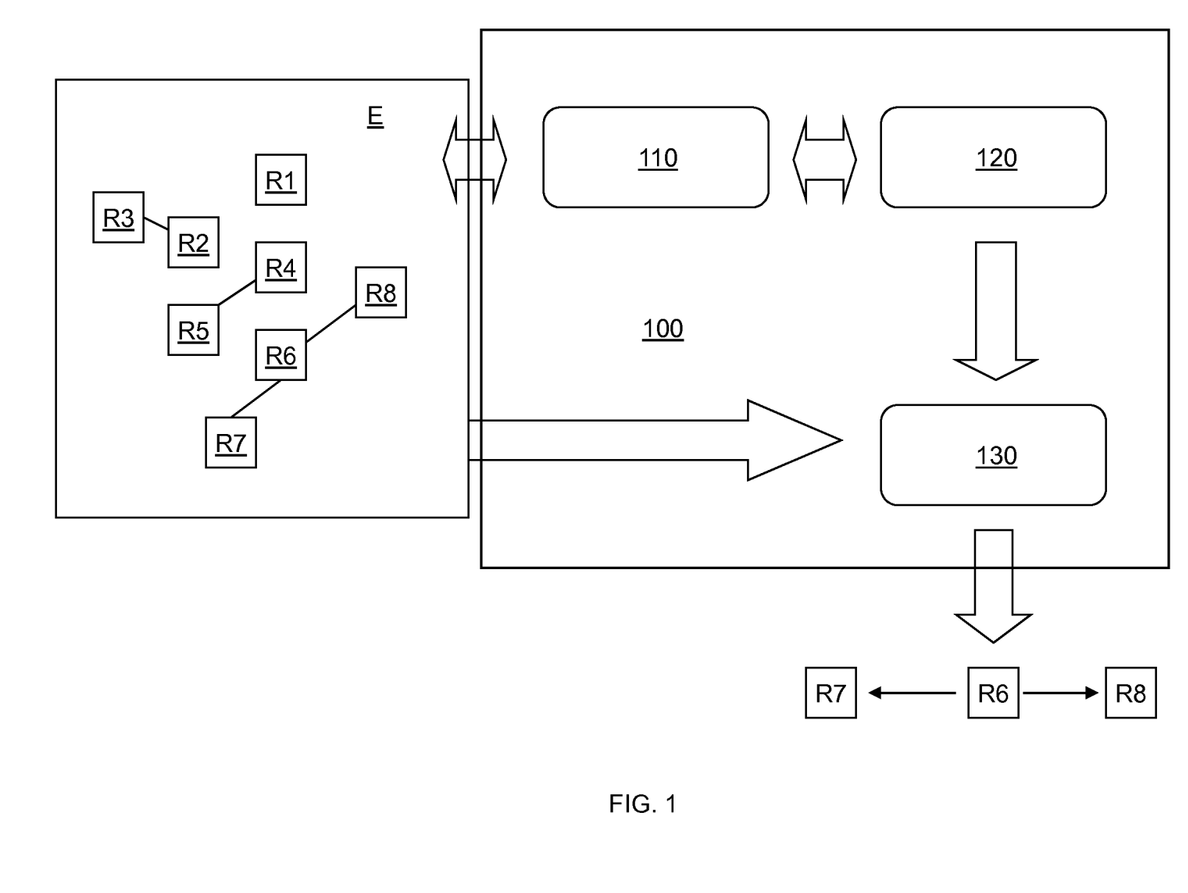
FIG. 1 illustrates a dependency analysis module according to an embodiment of the invention.

FIG. 1 illustrates a system 100 for analyzing reports according to an embodiment of the invention. The system 100 includes a BI execution engine 110 that is connected to a BI reporting environment E. The BI reporting environment E includes BI reports (e.g., BI reports R1, R2, R3, R4, R5, R6, R7, and R8). The BI execution engine 110 periodically executes the BI reports. Specifically, the BI execution engine 110 intelligently schedules the next execution of the BI reports and caches results of the executed report runs.

The BI execution engine 110 is connected to a change detection module 120, which takes snap shots of the BI reports between report execution runs and detects changes between the report snap-shots. In at least one embodiment, the change detection module 120 uses histogram difference methods to measure change. In another embodiment, the change detection module 120 predicts result(s) of future BI report runs (also referred to herein as an "expected trend") based on the snapshots. The change detection module 120 flags a BI report if the change deviates from the expected trend (e.g., from a predetermined threshold from the predicted report results).

The system 100 further includes a dependency analysis module 130 connected to the change detection module 120 and the BI reporting environment E. The change detection module 120 inputs the predicted results into the dependency analysis module 130. The dependency analysis module 130 uses data mining techniques to find dependencies between the BI reports. For example, a dependency is found between BI reports R6, R7, and R8, if when R6 changes unexpectedly (e.g., deviates from its expected trend), R7 and R8 also change unexpectedly.

In at least one embodiment of the invention, the dependency analysis module 130 performs a usage analysis, which analyzes usage of the BI reports in the past by business users and/or domain experts (also referred to herein as "analysts"). For example, in response to an unexpected change in BI report R5, a business user analyzed BI reports R4, R7, and R8. Thus, usage analysis finds dependencies between the BI reports R5, R4, R7, and R8. These dependencies are added to the dependencies found in the dependency analysis.

In at least one embodiment of the invention, the dependency analysis module 130 performs a fine grain analysis, which finds dependencies at a finer granularity than the report level. Report generation SQLs contain many inner and sub-queries. The fine grain analysis finds the query plan for the report generation SQL. Specifically, the fine grain analysis finds each sub-query that project out certain attributes in a sub-component of the report generation SQL. All the sub-components of the report generation SQL are collected.

Thus, an embodiment of the invention finds dependencies between reports at the sub-component level. For example, if BI reports R1 and R2 are dependent on each other, the fine grain analysis finds the sub-components in R1 which are dependent on R2, and visa-a-versa. As such, the search space for finding component level dependences is reduced because only dependencies across BI reports which have been dependent on each other in the past are examined (e.g., using usage analysis and/or dependency analysis). This helps to find "hidden" root causes corresponding to sub-components for which no report is defined.

More specifically, having knowledge of which sub-components in a report (e.g., subcomponent R1.A of R1 and R2.C of R2) are related/dependent, an embodiment of the invention infers that a change in a sub-component (e.g., R1.A) could have been triggered due to change in a dependent/related sub-component (e.g., R2.C). The user is notified with a list of possible "reasons" that could have triggered the changes in sub-component R1.A. This can be done despite the fact that there is no explicit report defined that contains both R1.A and R2.C subcomponents.

At least one embodiment of the invention ranks root causes. For example, when a user requests a root cause analysis for a given BI report (e.g., R2), all of the BI reports which are dependent on this BI report are scanned (e.g., R3). At least one embodiment checks the status of all of the sub-components to see if their results have deviated from the expected trend. If a significant deviation is found, then a transitive investigation is performed by finding other BI report and/or sub-component deviation(s) transitively. For example, if R3 has deviated from the expected trend by a predetermined threshold (e.g., as set by the user or manufacturer and/or administrator of the system 100 (e.g., default settings in the change detection module 120)), then any other report dependent on R3 is checked to see if it has also deviated. This transitive traversal is performed for a fixed number of steps (i.e., for a predetermined level of dependency from the BI report being analyzed (i.e., in the above example, R2)). Thus, for example, if R3 is dependent on R2, R4 is dependent on R3 (but not R2), and R5 is dependent on R4 (but not R2 or R3), then the root cause analysis is performed for 3 steps (i.e., levels) when R3, R4, and R5 are analyzed. The level of deviation from the expected trend for each BI report and/or sub-component is quantified (e.g., in percentage terms). The BI reports and/or sub-components are listed and sorted based on the deviation.

The following description provides an example of a root cause analysis. A railway manager looks at a BI report about time performance of different trains and notices that a set of trains have been delayed in Delhi. The delays could be due to various reasons, including a strike in the train car cleaning division which could lead to delay in cleaning of coaches of some trains headed towards Delhi. Delays could also be attributed to a railway accident in Itarsi, which could lead to delays of trains travelling to Delhi.

To find the root cause for the delays, the BI report "Delay status of trains passing through Itarsi" (R1) is examined. In R1, the sub-component "Delay of trains headed towards Delhi" shows significant deviation (i.e., meets a predetermined threshold of deviation). A transitive investigation reveals that the BI report "List of train accidents by region" (R2) is dependent on R1 but does not show significant deviation. However, a sub-component of R2, "List of train accidents in Itarsi", shows significant deviation (e.g., above a level of deviation above a predetermined threshold) from its expected trend. Accordingly, BI reports R1 and R2 are displayed to the manager as possible root causes.

Figure 2:
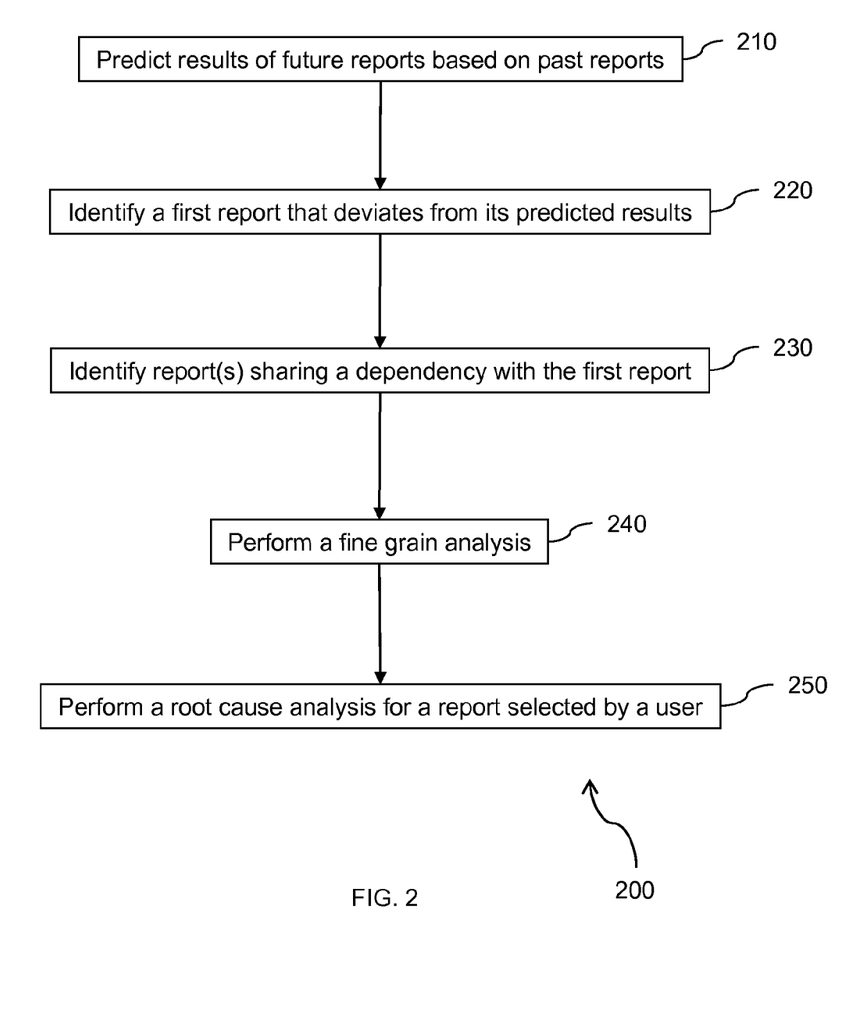
FIG. 2 is a diagram illustrating a method for analyzing reports according to an embodiment of the invention.

FIG. 2 is a diagram illustrating a method for analyzing reports (e.g., BI reports) according to an embodiment of the invention (e.g., using the system 100). Examples of reports include manufacturing reports, delivery reports, inventory reports, sales reports, transportation departure/arrival reports, performance reports, etc.

The results of future reports are predicted based on past reports 210 (e.g., via a calculator sub-component of the change detection module 120). For example, R1 is a report for "Inventory of Items A, B, and C". The change detection module 120 predicts the results for the August R1 report based on the R1 reports executed (i.e., produced, prepared) in June and July.

A first report that deviates from its predicted results is identified 220 (e.g., via an analyzer sub-component of the change detection module 120). In at least one embodiment, a predetermined threshold of deviation from a predicted result is set in the change detection module 120. In the above example, the prediction for the August R1 report is 200 units of items A, B, and C in inventory; and, the actual August R1 report shows 220 units in inventory. If the predetermined threshold of deviation is 20 or more units (or at least 10%), then the change detection module 120 identifies (e.g., flags) R1 (i.e., the first report).

One or more reports sharing a dependency with the first report is identified 230 by performing a dependency analysis and/or a usage analysis (e.g., via a first sub-component and second sub-component, respectively, of the dependency analysis module 130). As used herein, "dependency" refers to situations where contents/results of one report are influenced, affected, and/or are dependent upon contents/results of another report, and/or vice versa. For example, if R2 is a report on "Items A, B, and C Sold", then R1 (report for "Inventory of Items A, B, and C") and R2 share a dependency (R2 is dependent on R1). If R3 is a report on "Items A, B, and C manufactured", then R1, R2, and R3 share a dependency (R1 and R2 are dependent on R3).

The dependency analysis examines other reports to identify whether other reports deviate from their predicted results. If at least one second report is identified as deviating from its predicted results, then the first report and the at least one second report are labeled as sharing a dependency. If no other reports are identified as deviating from its predicted results, then the dependency analysis does not label any reports as sharing a dependency with the first report. Thus, for example, if R4, R5, R6, and R7 are identified as deviating from their respective predicted results, then R4, R5, R6, and R7 are each labeled as sharing a dependency with one another.

The usage analysis identifies report(s) that are analyzed (e.g., viewed, copied, printed, downloaded, requested) by an analyst (human and/or non-human) in response to the first report being identified as deviating from its predicted results. If one or more reports are analyzed by an analyst in response to the identification of the first report, then the first report and the report(s) analyzed by the analyst are labeled as sharing a dependency. If no reports are identified as being analyzed by an analyst in response to the identification of the first report, then the usage analysis does not label any reports as sharing a dependency with the first report. For example, if an analyst looks at reports R8, R9, and R10 in response to the identification that R1 deviates from its predicted results, then R1, R8, R9, and R10 are labeled as sharing a dependency.

In at least one embodiment of the invention, the dependency analysis module 130 further performs a fine grain analysis 240. More specifically, if the dependency analysis is performed, the dependency analysis module 130 examines sub-components of the first report and sub-components of the at least one second report to determine whether any of the sub-components of the first report share a dependency with any of the sub-components of the at least one second report. In the example above, R1 is a report of "Inventory of Items A, B, and C". Examples of sub-components of R1 are inventory of item A, inventory of items A and B combined, inventor of item C in January 2010, and inventory of item C in Store Alpha. Fine grain analysis labels the first report and the at least one second report as sharing a dependency if at least one sub-component of the first report and at least one sub-component of the at least one second report share a dependency.

For example, report R8 has a subcomponent S2 ("Units of item A sold by John Doe"); and, R9 has a subcomponent S4 ("Units of item A sold by Jane Doe"). Subcomponent S2 and S4 share a dependency because they are both dependent on a subcomponent ("Units of item A in inventory in Alpha store") since John and Jane work in Alpha store. In another example, R8 has a subcomponent S11 ("Units of item A delivered to Alpha store). Therefore, subcomponent S11 in R8 and subcomponent S4 in R9 share a dependency because subcomponent S4 in R9 ("Units of item A sold by Jane Doe") is dependent upon subcomponent S11 in R8 ("Units of item A delivered to Alpha store"). None of the reports are labeled if none of the sub-components of the first report share a dependency with any of the sub-components of the at least one second report. If the dependency analysis is not performed, then a fine grain analysis is not performed on sub-components of the at least one second report.

If the usage analysis is performed, then the fine grain analysis examines sub-components of the first report and sub-components of the at least one report analyzed by the analyst to determine whether any of the sub-components of the first report share a dependency with any of the sub-components of the at least one report analyzed by the analyst. The dependency analysis module 130 labels the first report and the at least one report analyzed by the analyst as sharing a dependency if at least one sub-component of the first report and at least one sub-component of the at least one report analyzed by the analyst share a dependency. If no dependency is found between the sub-components of the first report and the sub-components of the at least one report analyzed by the analyst, then no reports are labeled. If the usage analysis is not performed, then a fine grain analysis is not performed on sub-components of the at least one report analyzed by the analyst.

As described above, fine grain analysis can find dependencies between two or more reports even if a dependency is not found by the dependency analysis or usage analysis. For example, if no dependency is found after performing a dependency analysis and/or usage analysis on reports R11 and R12, a dependency may still be found when examining the sub-components of R11 and R12 (i.e., via fine grain analysis).

At least one embodiment of the invention performs a root cause analysis for a report selected by the user of the system 100 (also referred to herein as the "select report") 250. Examples of the select report include the first report (e.g., identified as deviating from its predicted value by the change detection module 120), the at least one second report (e.g., identified as also deviating from its predicted value in the dependency analysis), or the at least one report analyzed by the analyst (identified in the usage analysis).

Figure 3:
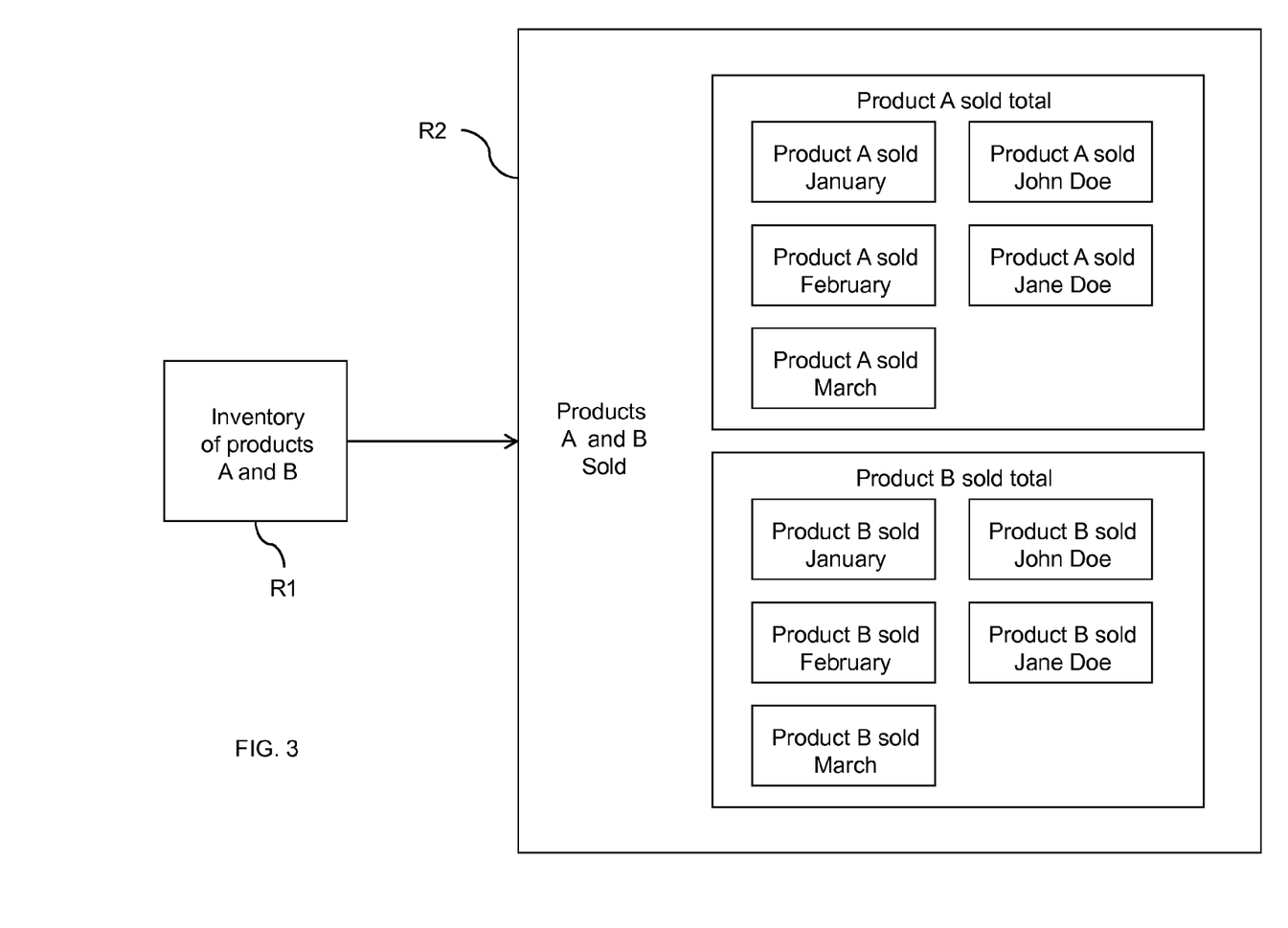
FIG. 3 is a diagram illustrating BI reports according to an embodiment of the invention.

The root cause analysis analyzes at least one dependent report, wherein the dependent report shares a dependency with the select report. For example, as illustrated in FIG. 3, R2 is analyzed based on its dependency on R1. The analysis of the at least one dependent report includes calculating a deviation for each of the sub-components of the dependent report that deviate from the predicted results for the dependent report. Thus, in the above example, each sub-component of R2 (e.g., total number of item A sold, number of item B sold by John Doe, number of item B sold in January) is compared to its respective predicted sub-component value and the deviation from the actual and predicted values is calculated (e.g., raw deviation in units and/or percentage deviation). The sub-components of the dependent report are ranked (e.g., listed in ascending or descending order) based on the calculated deviations.

In at least one embodiment of the invention, when the at least one dependent report has a threshold deviation from the predicted results of the dependent report at least one second dependent report is analyzed, wherein the second dependent report shares a dependency with the dependent report. In at least one embodiment, the second dependent report also lacks a dependency with the select report. Analysis of the at least one second dependent report calculates the deviation for each of the sub-components of the second dependent report that deviate from the predicted results of the second dependent report. Thus, further to the example above, R13 is a report on "Items X, Y, and Z Sold", which shares a dependency with R2 ("Items A, B, and C Sold"). Each sub-component of R13 (e.g., number of item X sold, number of item Y sold by Jane Doe, number of item Z sold in January 2009) is compared to its respective predicted sub-component value and the deviation from the actual and predicted values is calculated (e.g., raw deviation in units and/or percentage deviation). The sub-components of the dependent report and/or the sub-components of the second dependent report are ranked based on the calculated deviations.

Multiple levels of dependency from the select report can be examined. For instance, if R20 is the select report, R21 is dependent on R20, R22 is dependent on R21 (but not R20), and R23 is dependent on R22 (but not R21 or R20), then the root cause analysis is performed for 3 steps (i.e., levels) when R21, R22, and R23 are analyzed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
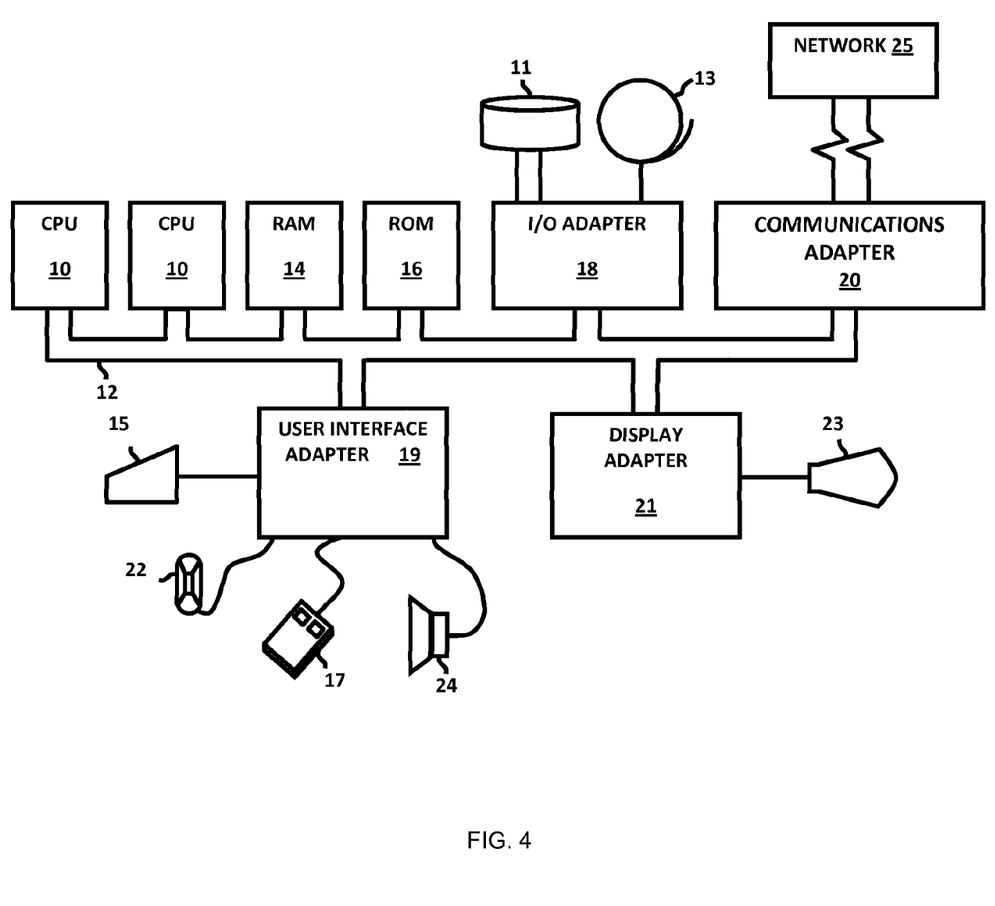
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method executed by a processor for analyzing a plurality of reports, said method comprising:
   predicting results of future reports based on past reports;
   identifying a first report that deviates from its predicted results with a change detection module; and
   performing a dependency analysis and a usage analysis with a dependency analysis module,
   said performing of the dependency analysis including:
   identifying at least one second report that deviates from its predicted results, and
   labeling the first report and the at least one second report as sharing a dependency, and
   said performing of the usage analysis including:
   identifying at least one report that has previously been analyzed by a human analyst, said at least one report that has previously been analyzed by a human analyst having been requested by the human analyst in response to said identifying of the first report, and
   subsequent to said identifying at least one report that has previously been analyzed by a human analyst, labeling the first report and the at least one report analyzed by the human analyst as sharing a dependency based on the fact that said at least one report that has previously been analyzed by a human analyst was requested by the human analyst in response to said identifying of the first report.

2. The method according to claim 1, further comprising:
   when the dependency analysis is performed, identifying at least one sub-component of the first report and at least one sub-component of the at least one second report that share a dependency; and
   when the usage analysis is performed, identifying at least one sub-component of the first report and at least one sub-component of the at least one report analyzed by the human analyst that share a dependency.

3. The method according to claim 1, further comprising performing a root cause analysis for a select report, the root cause analysis including:
   analyzing at least one dependent report, the dependent report sharing a dependency with the select report, said analyzing of the at least one dependent report including calculating a deviation for each of the sub-components of the dependent report that deviate from the predicted results of the dependent report; and
   ranking the sub-components of the dependent report based on the calculated deviations.

4. The method according to claim 3, wherein the select report is the first report, the at least one second report, or the at least one report analyzed by the human analyst.

5. The method according to claim 3, further comprising, when the at least one dependent report has a threshold deviation from the predicted results of the dependent report:
   analyzing at least one second dependent report, the second dependent report sharing a dependency with the dependent report, said analyzing of the at least one second dependent report including calculating a deviation for each of the sub-components of the second dependent report that deviate from the predicted results of the second dependent report; and
   ranking the sub-components of the dependent report and the sub-components of the second dependent report based on the calculated deviations.

6. A method executed by a processor for analyzing a plurality of reports, said method comprising:
   predicting results of future reports based on past reports;
   identifying a first report that deviates from its predicted results with a change detection module;
   performing a dependency analysis and a usage analysis with a dependency analysis module,
   said performing of the dependency analysis including, labeling the first report and at least one second report as sharing a dependency if the at least one second report deviates from its predicted results, and
   said performing of the usage analysis including identifying at least one report that has previously been analyzed by a human analyst, said at least one report that has previously been analyzed by a human analyst having been requested by the human analyst in response to said identifying of the first report, and subsequent to said identifying at least one report that has previously been analyzed by a human analyst, labeling the first report and the at least one report analyzed by the human analyst as sharing a dependency based on the fact that said at least one report that has previously been analyzed by a human analyst was requested by the human analyst in response to said identifying of the first report; and
   performing a fine grain analysis, including:
   if the dependency analysis is performed, labeling the first report and the at least one second report as sharing a dependency if at least one sub-component of the first report and at least one sub-component of the at least one second report share a dependency, and
   if the usage analysis is performed, labeling the first report and the at least one report analyzed by the human analyst as sharing a dependency if at least one sub-component of the first report and at least one sub-component of the at least one report analyzed by the human analyst share a dependency.

7. The method according to claim 6, further comprising performing a root cause analysis for a select report, the root cause analysis including:
   analyzing at least one dependent report, the dependent report sharing a dependency with the select report, said analyzing of the at least one dependent report including calculating a deviation for each of the sub-components of the dependent report that deviate from the predicted results of the dependent report; and
   ranking the sub-components of the dependent report based on the calculated deviations.

8. The method according to claim 7, wherein the select report is the first report, the at least one second report, or the at least one report analyzed by the human analyst.

9. The method according to claim 7, further comprising, when the at least one dependent report has a threshold deviation from the predicted results of the dependent report:
   analyzing at least one second dependent report, the second dependent report sharing a dependency with the dependent report and lacking a dependency from the select report, said analyzing of the at least one second dependent report including calculating a deviation for each of the sub-components of the second dependent report that deviate from the predicted results of the second dependent report; and
   ranking the sub-components of the dependent report and the sub-components of the second dependent report based on the calculated deviations.

10. A method executed by a processor for analyzing a plurality of reports, said method comprising:

predicting results of future reports based on past reports;

identifying a first report that deviates from its predicted results with a change detection module;

performing a dependency analysis and a usage analysis with a dependency analysis module, said performing of the dependency analysis including:

identifying at least one second report that deviates from its predicted results, and labeling the first report and the at least one second report as sharing a dependency, and said performing of the usage analysis including:

identifying at least one report that has previously been analyzed by a human analyst, said at least one report that has previously been analyzed by a human analyst having been requested by the human analyst in response to said identifying of the first report, and subsequent to said identifying at least one report that has previously been analyzed by a human analyst, labeling the first report and the at least one report that has previously been analyzed by the human analyst as sharing a dependency based on the fact that said at least one report that has previously been analyzed by a human analyst was requested by the human analyst in response to said identifying of the first report; and performing a root cause analysis for a select report, the root cause analysis including:

analyzing at least one dependent report, the dependent report sharing a dependency with the select report, said analyzing of the at least one dependent report including calculating a deviation for each of the sub-components of the dependent report that deviate from the predicted results of the dependent report; and ranking the sub-components of the dependent report based on the calculated deviations.

\* \* \* \* \*